(12) United States Patent
Vogler et al.

(10) Patent No.: US 7,487,069 B2
(45) Date of Patent: Feb. 3, 2009

(54) METHOD FOR GENERATING A CONTROL OUTPUT FOR A POSITION CONTROL LOOP

(75) Inventors: Sven Vogler, Heidelberg (DE); Roland Kaplan, Heidelberg (DE); Robert Weikert, Lauf (DE); Roelof Wijnaendts-Van-Resandt, Bad Schoenborn (DE)

(73) Assignee: Heidelberg Instruments Mikrotechnik GmbH, Heidelberg (DE)

( * ) Notice: Subject to any disclaimer, the term of this patent is extended or adjusted under 35 U.S.C. 154(b) by 0 days.

(21) Appl. No.: 11/862,808

(22) Filed: Sep. 27, 2007

(65) Prior Publication Data

US 2008/0021671 A1    Jan. 24, 2008

Related U.S. Application Data

(63) Continuation of application No. 11/528,328, filed on Sep. 28, 2006, now abandoned, which is a continuation of application No. 11/314,344, filed on Dec. 22, 2005, now abandoned, which is a continuation of application No. 11/090,130, filed on Mar. 28, 2005, now abandoned, which is a continuation of application No. 10/628,423, filed on Jul. 29, 2003, now abandoned, which is a continuation of application No. 10/198,077, filed on Jul. 19, 2002, now abandoned, which is a continuation of application No. PCT/EP01/00577, filed on Jan. 18, 2001.

(30) Foreign Application Priority Data

Jan. 19, 2000    (DE) ............................... 100 02 196

(51) Int. Cl.
*G05B 19/18* (2006.01)

(52) U.S. Cl. .................... 702/189; 702/150; 250/235; 250/236; 359/196; 356/124; 700/56

(58) Field of Classification Search ................ 702/189, 702/85, 94, 124, 126, 127, 150, 159, 175; 250/261, 262, 201.9, 203.1, 203.2, 205, 234, 250/235, 236; 359/196–205, 212, 214–217, 359/800, 813, 838, 873, 874; 356/4.07, 124; 700/56

See application file for complete search history.

(56) References Cited

U.S. PATENT DOCUMENTS 4,272,190 A * 6/1981 Shapiro ...................... 356/124

(Continued)

FOREIGN PATENT DOCUMENTS

DE            4212066         10/1993

(Continued)

*Primary Examiner*—Carol S Tsai
(74) *Attorney, Agent, or Firm*—Crowell & Moring LLP

(57) ABSTRACT

A method for optically detecting the position of a moveable test object (10), especially a mirror or reflector, in which a measuring beam (6) produced by a light source (2) is reflected by the test object (10 and reaches a position-sensitive light detector (12) which carrier out a conversion into information corresponding to the position of the test object (10). The invention enables the position of mirrors, especially rotating mirrors, to be quickly measured optically using a simple optical construction. The measuring beam (6) is focused onto the light detector (12) by an optical system (8). A signal corresponding to the geometric center or the maximum ($I_0$) of the intensity distribution of the focused measuring spot is determined based on the measured values obtained by the light detector (12).

15 Claims, 3 Drawing Sheets

U.S. PATENT DOCUMENTS

| | | | |
|---|---|---|---|
| 4,318,582 A | | 3/1982 | Minoura et al. |
| 4,800,270 A | * | 1/1989 | Blais .................... 250/235 |
| 4,851,660 A | | 7/1989 | Juds et al. |
| 5,187,364 A | * | 2/1993 | Blais .................... 250/236 |
| 5,303,080 A | * | 4/1994 | O'Brien et al. .......... 359/196 |
| 5,748,315 A | * | 5/1998 | Kawai et al. ............ 356/484 |
| 5,796,222 A | * | 8/1998 | Grodevant ............... 318/119 |
| 6,037,583 A | * | 3/2000 | Moehler et al. .......... 250/235 |
| 6,307,583 B1 | | 3/2000 | Moehler et al. |
| 6,154,270 A | * | 11/2000 | Ozawa ................... 355/53 |
| 6,437,358 B1 | * | 8/2002 | Potucek et al. ......... 250/559.45 |
| 6,496,213 B1 | * | 12/2002 | Ueno .................... 347/234 |

FOREIGN PATENT DOCUMENTS

| | | | |
|---|---|---|---|
| EP | 0390969 | | 10/1990 |
| JP | 63-16216 | | 1/1988 |
| JP | 63016216 A1 | * | 1/1988 |
| JP | 10-104541 | | 4/1998 |
| JP | 10104541 A1 | * | 4/1998 |

* cited by examiner

US 7,487,069 B2

METHOD FOR GENERATING A CONTROL OUTPUT FOR A POSITION CONTROL LOOP

CROSS REFERENCE TO RELATED APPLICATIONS

This application is a continuation of application Ser. No. 11/528,328 filed Sep. 28, 2006, which was a continuation of application Ser. No. 11/314,344, filed Dec. 22, 2005, which was a continuation of application Ser. No. 11/090,130 filed Mar. 28, 2005, which was a continuation of application Ser. No. 10/628,423 filed Jul. 29, 2003, which was a continuation of application Ser. No. 10/198,077 filed Jul. 19, 2002, which was a continuation of International Patent Application No. PCT/EP01/00577 filed Jan. 18, 2001, designating the United States of America, the entire disclosures of which are incorporated herein by reference. Priority is claimed based on Federal Republic of Germany Patent Application No. DE 100 02 196.4 filed Jan. 19, 2000.

BACKGROUND OF THE INVENTION

The invention relates to a method for generating a control output for a position control loop or circuit and to an apparatus for carrying out such a method.

Nater et al., published European Patent Application No. EP 390,969, discloses a method of this type, according to which a measuring beam, which is produced by a light source, is reflected by a movable test object in the form of a mirror and reaches a position-sensitive light detector. The measuring beam is focused on the light detector by an optical system. The measured values obtained by the light detector are supplied to a computer or signal processor, in which a position signal corresponding to the geometric center or the maximum of the intensity distribution of the focused measuring spot is determined by interpolation. The analog signals of the light detector are supplied directly to the signal processor and are initially processed in analog form, with signals corresponding to the desired position being included in addition, to obtain a digital, interpolated signal corresponding to the determined position of the focal spot. The interpolated signal is supplied to a control loop to control the test object. This document contains no indication that a function which corresponds to the function of the actual intensity distribution of the measuring beam on the light detector should be taken into account. Furthermore, the analog signals are supplied directly to the signal processor.

Brunk, published German Patent Application No. DE 42 12 066A, discloses a method and an apparatus for determining the position of an optical line according to which an image containing the optical line is recorded line-by-line with a video camera to generate a video signal and a pixel clock. A digital representation of the optical line is determined from the video signal. The video camera is oriented in such a way that the lines of the video camera cross the optical line. There is no position control and no determination of a position signal by interpolation, and no suggestion is made of such a combination of features.

The book entitled Bauelemente der Optik, Taschenbuch für Konstrukteure [Components in Optics, Pocket Edition for Designers], H. Naumann and G. Schröder, 4th edition, Hanser-Verlag, 1983, describes a method that is also known as the autocollimation method and permits the measurement of the angular position of rotating mirrors. A beam collimated by a collimation lens is reflected as a measuring beam on the mirror to be measured, and the angle of the reflected beam to the incident light beam as it passes back through the collimation lens is converted into position information. This information conversion, however, introduces an additional error source in the form of lens errors into the measurement. A computational correction of such errors prolongs the computing time required to determine the information corresponding to the momentary angular position of the rotating mirror.

Minoura et al., U.S. Pat. No. 4,318,582, further discloses a two-dimensional scanning apparatus comprising two rotating mirrors for deflecting a light beam of a light source, particularly a laser, in two substantially perpendicular directions. The rotating mirrors are rotated by electrical drives. To determine the angular position of the rotating mirrors, signal generators are provided, which are coupled with the drive shafts of the electric drive motors. The information recorded by the signal generators is supplied to the corresponding position control loop of the respective rotating mirror. Such signal generators for detecting the angular position of a shaft are typically inductive or electromagnetic position sensors, which require highly precise manufacturing and rarely satisfy today's accuracy requirements in practice, or can satisfy them only at high manufacturing costs.

SUMMARY OF THE INVENTION

It is an object of the invention to provide an improved method for generating a control output for a position control loop or circuit.

Another object of the invention is to provide a method which enables rapid optical measurement of the position of mirrors, particularly rotating mirrors, using a simple optical design.

A further object of the invention is to provide a method which achieves an increase in resolution at low cost.

It is also an object of the invention to provide an apparatus for generating a control output for a position control loop or circuit in accordance with the method of the invention.

An additional object of the invention is to provide an apparatus for carrying out the method which is not technically complex and which avoids additional error sources.

Yet another object of the invention is to provide a method and apparatus for rapid optical measurement of the position of mirrors, particularly in scanning devices, with a simple optical design.

A still further object of the invention is to provide a method and apparatus which generates a signal that can be input as a control value into a control loop or circuit associated with a movable mirror, or that can be directly used as an actuating signal for a mirror whose instantaneous position is to be measured.

These and other objects are achieved in accordance with the present invention by providing a method for generating a control output for a position control loop of a movable test object, said method comprising optically measuring the position of the test object by focussing a measuring beam generated by a light source onto the test object using an optical system, and reflecting the measuring beam from the test object as a focused spot onto a position-sensitive light detector to obtain measured position information, reading the measured position information obtained from the light detector serially into an analog-to-digital converter to obtain digitized position data, transmitting the digitized position data a digital signal processor, interpolating the digitized position data in said digital signal processor taking into account a distribution function corresponding to the actual intensity distribution to give a position signal corresponding to the geometric center or the maximum ($I_0$) of the intensity distribution of the focused measuring spot, calculating a desired position of the test object with a system control computer, supplying the calculated desired position to the signal processor, generating a digital control value by comparing the position signal of the focused measuring spot determined by interpolation with the calculated desired position, generating an analog control value from the digital control value in a digital-to-analog converter, and inputting the analog control value into a control loop for regulating the position of the test object.

In accordance with a further aspect of the invention, the objects are achieved by providing an apparatus for generating a control output for a position control loop of a movable test object, comprising a position-sensitive light detector, an analog-to-digital converter connected to receive measured position information from said light detector, a signal processor connected to receive digital position data from said analog-to-digital converter, said signal processor comprising a memory for storing a distribution function, and a digital-to-analog converter connected to receive a digital signal from said signal processor and generate an analog position regulating signal therefrom.

The proposed method and the proposed apparatus for carrying out the method enable rapid low-cost optical measurement of the position of the test object, which is configured particularly as a mirror or reflector and the mechanical movement of which is optically detected. A displacement, particularly a proportional displacement, of a light spot on the position-sensitive light detector, hereinafter also referred to as an optical position sensor, corresponding to the mechanical movement of the test object is used.

The light source may advantageously be a semiconductor laser or a diode laser, and a real image of the light source is produced on the light detector or the position sensor by an optical system. This optical system is constructed as a focusing unit and in the simplest case can be configured as a lens with a positive focal length, a convex lens, or a system of several lenses, e.g., an achromatic lens or objective. A measuring beam is produced by the light source and an aperture with a predefined aperture diameter A. This measuring beam is directed at the mirror by the optical system and/or the focusing unit and is deflected by the mirror onto the position-sensitive light detector or optical position sensor.

Advantageously, the test object or mirror guides the light beam or measuring beam directly onto the light detector, such that additional errors, particularly due to lens errors, are avoided. The proposed method and the proposed apparatus for carrying out the method make it possible rapidly to generate a control value for the positioning of rotating mirrors, using a focused laser beam as the measuring beam and calculation and/or interpolation to determine the position of the measuring beam with a higher resolution than the detector resolution and thus permitting the use of a rapidly readable detector with a lower resolution.

It should be noted that according to the invention, in contrast to the initially mentioned autocollimation method, no parallel light is reflected on the mirror or the reflector, also referred to as the test object, and the optical imaging system is not used twice. An aperture with a predefined aperture diameter is advantageously provided between the light source and the optical imaging system. The optical imaging system is constructed as a focusing unit, and the position sensor or light detector is located at the focal point of the measuring beam focused on the test object or mirror or reflector. The size of the light spot detected by the position-sensitive light detector is not decisive in practice, since its center position is used. The center of the light spot is defined by the maximum intensity or, if the intensity is uniform, by the geometric center or center of mass of the spot.

The light detector comprises individual regions or cells, hereinafter referred to as pixels. Electrical signals are produced as a function of and preferably proportionally to the radiation intensity on the corresponding pixel. The light detector or its regions or pixels can be photodiodes, phototransistors, CCDs, light-sensitive resistors, or even analog image capture tubes. The focused light beam or spot is digitized by the position-sensitive light detector and a downstream electronics unit. Measured electrical values corresponding to the respective radiation intensity are produced by the pixels that detect the spot. These measured values contain information on the intensity or intensity distribution of the spot.

The measured values are subjected to a calculation and/or interpolation process to determine the geometric center or maximum of the intensity distribution of the light beam or spot. The distribution function of the light intensity of the spot is advantageously used as a basis and taken into account in the evaluation or calculation. For this purpose, the distribution function of the spot sensed by the light detector can be measured especially while the test object or mirror or reflector is initially stationary and input into the computer, which subsequently determines the geometric center or maximum of the intensity distribution when the method is executed.

Furthermore, in a preferred embodiment, the known intensity distribution function can be input into the computer and kept available for the calculation, particularly in a memory. The measured values, which contain information on the intensity at the discrete measuring points or scanning points of the pixels, are now used to determine, on the basis of the inventive evaluation and calculation, the information on the position of the geometric center or maximum at those points which had not been measured, particularly due to the finite size of the individual regions or cells of the light detector.

The intensity distribution function, which is assumed to be known or has previously been determined, thus makes it possible in a particularly advantageous manner to determine the geometric center or maximum of the intensity distribution. Based on the calculation performed according to the invention, the resolution of the light detector or the position sensor is increased in a particularly advantageous manner. Thus, the position of the measuring beam can be determined with a higher resolution than the detector resolution. Consequently, a light detector with a lower resolution capable of being rapidly triggered can be used for high resolution.

Further refinements and special features of the invention are set forth in the following description of preferred embodiments.

BRIEF DESCRIPTION OF THE DRAWINGS

The invention will be described in further detail hereinafter with reference to non-limiting, illustrative preferred embodiments shown in the accompanying drawings, in which.

DETAILED DESCRIPTION OF PREFERRED EMBODIMENTS

Figure 1:
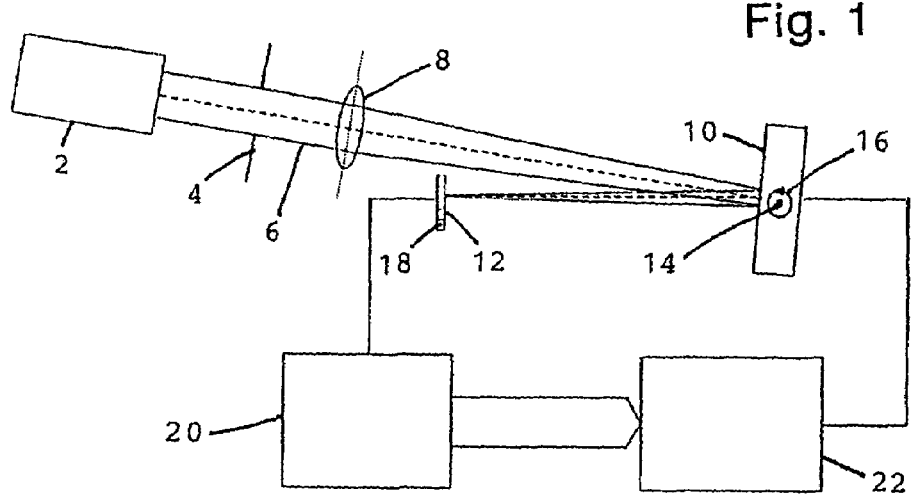
FIG. 1 is a schematic diagram of a first embodiment of apparatus according to the invention for carrying out the method of the invention.

FIG. 1 shows an apparatus according to the invention comprising a light source 2 that is preferably constructed as a laser and/or a diode laser. A measuring beam 6 is produced by an aperture 4 with a predefined aperture diameter A and reaches an optical imaging system 8. In the simplest case, this optical imaging system 8 comprises a lens with a positive focal length or a convex lens, possibly a system of several lenses, e.g., an achromatic lens or objective. As may be seen, the measuring beam from optical system 8 reaches a mirror 10 to be measured and is reflected by the mirror onto a position-sensitive light detector 12 at a predetermined and preferably small angle to the perpendicular.

The mirror 10 is configured as a rotating mirror, which can be rotated about an axis 14 orthogonal to the drawing plane in accordance with arrow 16. The measuring beam is focused with a long focal length by optical system 8, with light detector 12 at the focal point. The position-sensitive light detector 12, also referred to as a position detector, is for instance a row of diodes, comprising particularly 168 cells 18 for measuring the position of the focal spot. For reasons of clarity, the drawing shows only a few of these cells 18. Their number is determined as a function of the corresponding requirements. This is also true for the size of cells 18 which have, for instance, an edge length of approximately 64 μm.

Cells 18 are light-sensitive regions, hereinafter referred to as pixels, and enable electrical signals to be generated corresponding to and/or proportional to the radiant intensity incident on the respective pixel. The light intensities striking the individual photosensitive cells 18 or pixels are read out for this purpose. The focal spot has a diameter D, which is greater by a predefined factor than the size or the edge length of pixels 18. The factor preferably ranges between 10 and 30, particularly between 15 and 25. An electronic unit 20, preferably constructed as a position control loop or circuit, is connected downstream of the position-sensitive light detector 12 and is used to compare the determined position of the focal spot with the calculated desired position for a desired angle adjusted on mirror 10.

As an alternative, or in addition thereto, the electronics unit is used to execute the calculation and/or interpolation method in order to establish or determine the position of the geometric center or center corresponding to the maximum intensity, or the geometric center of the focal spot if the intensity is uniform. From the difference, an analog control signal is generated for an integrated control loop 22 that is assigned to mirror 10.

If test object 10 comprises a mirror, particularly a rotating mirror, the mirror may be a component of a scanning device. The mirror thus has a double use in this preferred embodiment. The light source 2 produces the measuring beam in the described manner and, furthermore, an additional light source, which is advantageously also a laser, is used to perform the scanning procedure. The actual values of the mirror position obtained by the proposed optical determination of the position by the light detector and the subsequent evaluation and calculation of the geometric center or maximum of the intensity distribution are provided by electronics unit 20 in the described manner to control circuit 22 of mirror 10. Furthermore, the values required for scanning and positioning of mirror 10 of the scanning device, particularly desired position values, are included in the control system.

Figure 2:
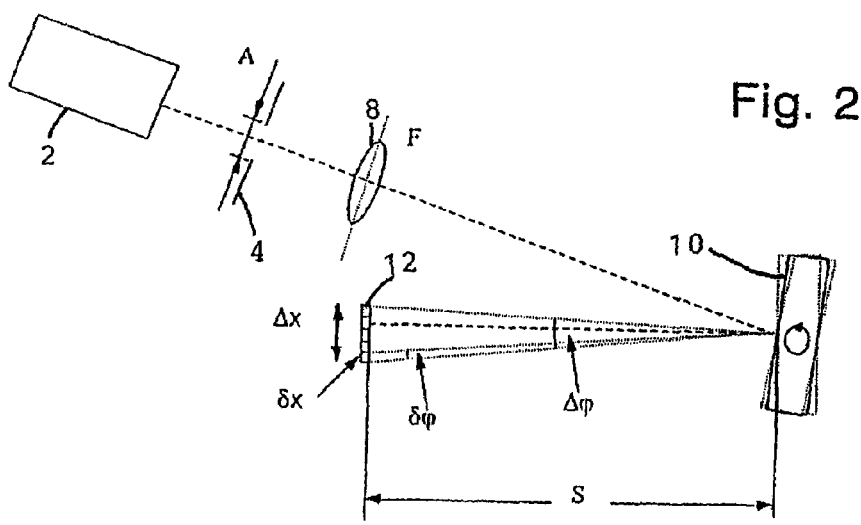
FIG. 2 is a diagram similar to FIG. 1 explaining the symbols used.

According to FIG. 2, aperture 4 has an aperture diameter A and the optical imaging system 8 a focal length F. Light outputs striking the individual photo-sensitive cells or pixels 18 are read out and if the ratio of focal spot diameter D on light detector 12 to pixel size δx is suitable, the position of the geometric center or center of the focal spot of the measuring beam is determined from this information by a calculation and/or interpolation process, e.g., exact to $1/12$ of the size of the individual cells or pixels 18. Diameter D of the focal spot results from aperture diameter A, focal length F of optical system 8, and wavelength λ of the laser light used:

$$D = \frac{\pi F}{\lambda A}$$

The angular resolution δφ of the system results from the resolution for determining the beam position of, for instance, δx/12 and distance S between mirror 10 and detector 12:

$$\delta\varphi = \frac{\delta x / 12}{S}$$

The detectable angular range Δφ similarly results from dimension Δx of the detector:

$$\Delta\varphi = \frac{\Delta x}{S}$$

Figure 3:
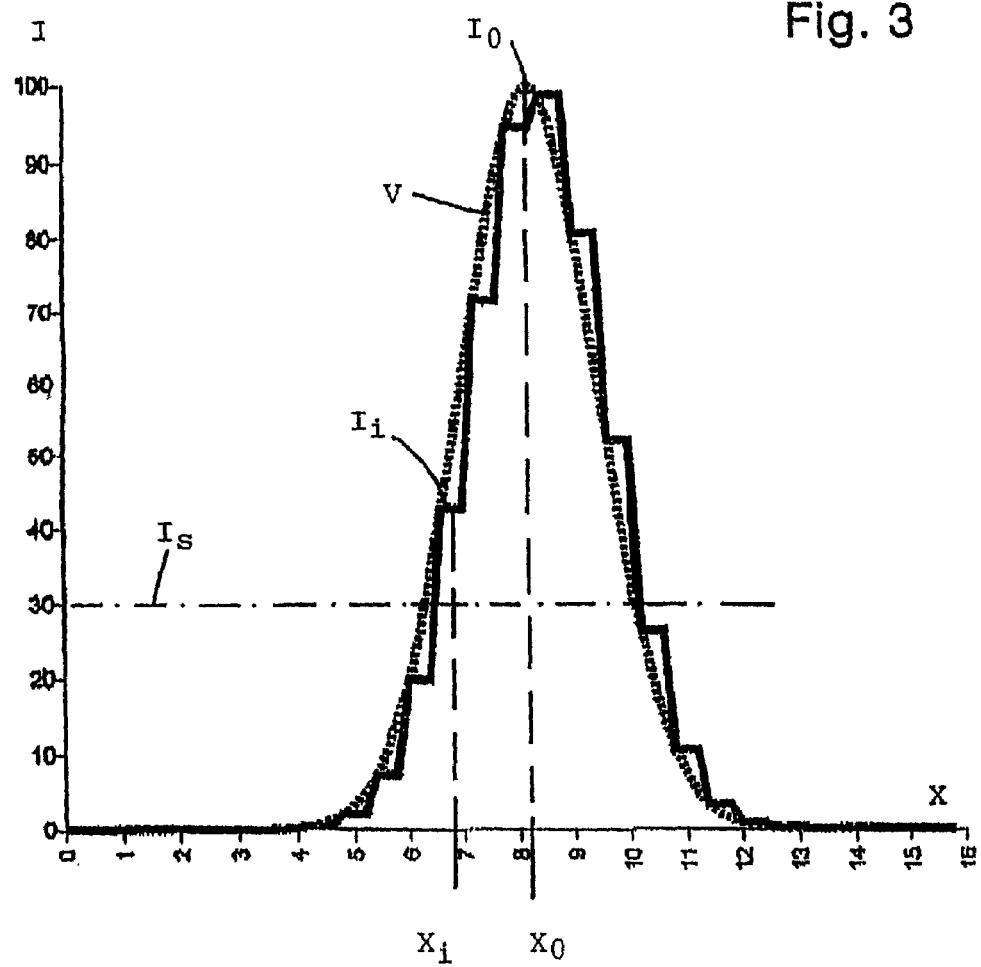
FIG. 3 is a graph of the intensity distribution of the spot and the scanning values.

FIG. 3 shows a graph of the intensity distribution of a spot and the scan values or measured values detected by the light detector at positions XI plotted over the longitudinal dimension X of the light detector. A position Xi is assigned to the individual intensity values Ii. In this illustrative embodiment, the intensity distribution I corresponds to a bell curve or a Gaussian distribution curve with a distinct maximum $X_0$. As may be seen, the largest detected scan value, due to the finite magnitude of the pixels of the light detector, spaced a distance from the actual maximum of the intensity curve. According to the invention, the geometric center or the maximum intensity is calculated, particularly interpolated, by the aforementioned computer, which receives the scan values of the intensity distribution of the spot on the light detector. This calculation is basically done according to the following formula:

$$x_0 = \frac{\sum I_i \cdot x_i}{\sum I_i}.$$

Advantageously, from among the available measured values, or a predefined subset thereof, e.g., three geometrically sequential measured values are used, one of which must be the maximum detected measured value. The selected measured values serve to calculate the parameters of a describing function corresponding to the intensity distribution. For instance, three measured values may be required to describe a parabola with three parameters. Position $X_0$ of maximum intensity $I_0$ is then calculated from the parameters thus computed.

It is particularly important that the intensity distribution function, which is basically known, is taken into account in the calculation. Preferably, the calculation is performed based on a function that corresponds to the actual intensity distribution. If it is known, for instance, that the measured values of the spot basically lie along a bell curve, this fact is taken into account in the calculation of the geometric center or the maximum of intensity distribution V.

Based on the measured values or information on the intensity at discrete measuring points or scanning points obtained by the measurement by the light detector, the information on the position of the maximum at those points where measured values are not obtained because of the finite magnitude of the cells of the light detector, is provided on the basis of the calculation and evaluation according to the invention. This additional information on the position of the maximum results from the intensity distribution function, which is assumed to be known.

In this calculation or interpolation, the low intensity values, which contain a relatively large error, are preferably suppressed. For this purpose, a minimum value or threshold value $I_s$ is defined. Threshold value $I_s$ lies below the maximum measured value by a defined amount, preferably in the range of between 20% and 50%, and is advantageously on the order of magnitude of 30%. If threshold value $I_s$ in the illustrative embodiment shown is defined at 30%, six measured values are taken into account in the aforementioned calculation in this illustrative embodiment. Thus, with sufficient illumination of the pixels, a resolution far above the geometric resolution of the light detector can be obtained.

Figure 4:
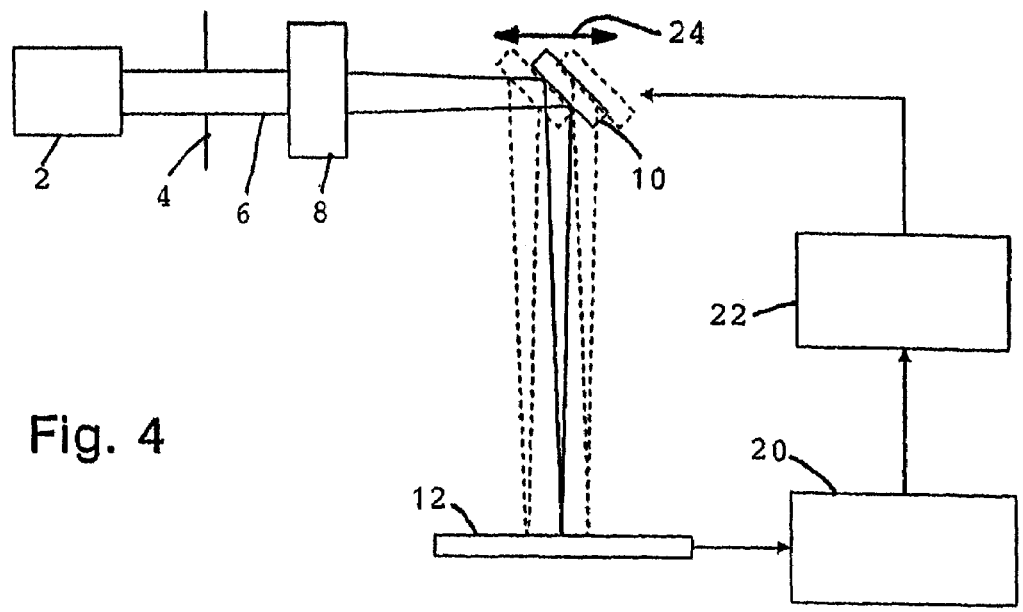
FIG. 4 is a schematic diagram of a further illustrative embodiment of the apparatus with a linearly movable mirror.

FIG. 4 shows a further illustrative embodiment according to which the test object 10 can be linearly moved as indicated by double arrow 24. The broken lines indicate positions of test object 10, which may be constructed as a reflector, which are linearly displaced relative to one another. The measuring spot moves on position-sensitive light detector 12 corresponding to the movement of test object 10. The foregoing explanations regarding the remaining components, i.e., light source 2, aperture 4, etc. apply correspondingly to this embodiment.

Figure 5:
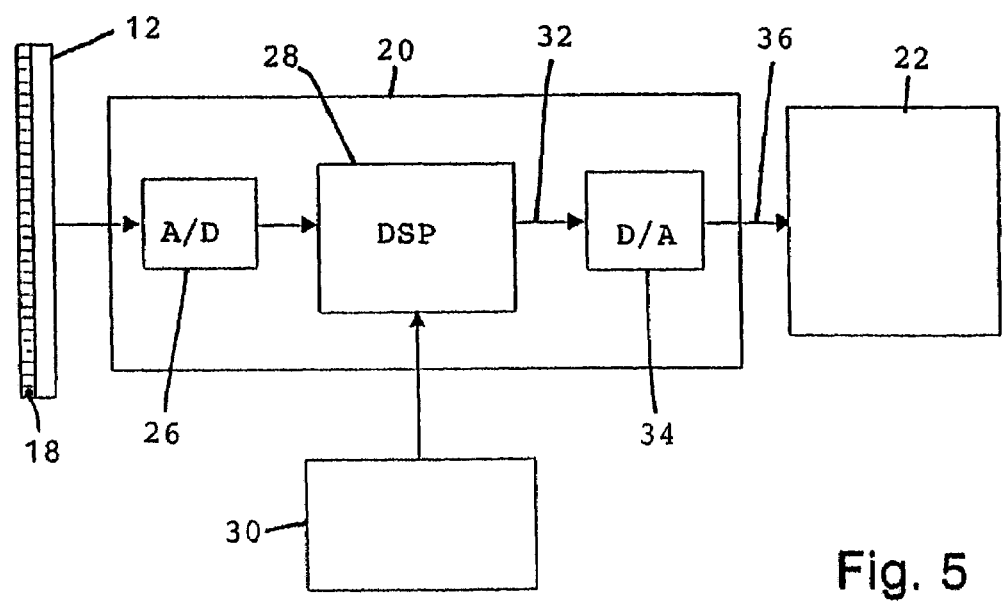
FIG. 5 is a block diagram of the readout and control electronics for carrying out the invention.

FIG. 5 is a block diagram of electronics unit 20, which can also be referred to as readout and control electronics. Pixels 18 of light detector 12 are read out, particularly serially, via an analog-to-digital (A/D) converter 26, e.g., with an 8-bit resolution. The digitized data is transmitted to a downstream signal processor 28, which first determines the position of the center of mass of the intensity distribution in the aforementioned manner from the measured values of the individual pixels 18, preferably by interpolation. In this calculation or interpolation, low measured values, which are subject to errors, are advantageously suppressed by introducing the minimum value or threshold value and are not taken into account in the calculation or interpolation.

System control computer 30 supplies to computer or digital signal processor (DSP) 28 a desired value, particularly a desired 16-bit value, for the position of the focal spot, which was calculated from the desired angular position of the test object or mirror. The calculated or interpolated geometric center is compared with this value, and a digital control value 32 is generated from the deviation. An analog control value 36 is generated therefrom in the downstream digital-to-analog (D/A) converter 34, which is preferably constructed as a 14- or 16-bit digital-to-analog converter. This control value 36 is supplied to the control circuit 22 of the test object or mirror.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method for generating a control output for a position control loop of a movable test object, said method comprising the steps of:
    optically measuring the position of the test object by focussing a measuring beam generated by a light source onto the test object using an optical system, and reflecting the measuring beam from the test object as a focussed spot onto a position-sensitive light detector to obtain measured position information, wherein the focussed spot on the position-sensitive light detector impinges at least three light-detecting cells;
    reading the measured position information obtained from the at least three light-detecting cells of the light detector serially into an analog to digital converter to obtain digitized position data;
    transmitting the digitized position data a digital signal processor;
    interpolating the digitized position data in said digital signal processor taking into account a distribution function corresponding to the actual intensity distribution to give a position signal corresponding to the geometric center or the maximum ($I_0$) of the intensity distribution of the focused measuring spot;
    calculating a desired position of the test object with a system control computer;
    supplying the calculated desired position to the signal processor;
    generating a digital control value by comparing the position signal of the focussed measuring spot determined by interpolation with the calculated desired position;
    generating an analog control value from the digital control value in a digital to analog converter, and
    inputting the analog control value into a control loop for regulating the position of the test object.

2. A method according to claim 1, wherein said movable test object is a mirror or reflector.

3. A method according to claim 1, wherein a known distribution function of intensity (I) is taken into account when the geometric center or the maximum (I0) is determined.

4. A method according to claim 1, wherein lower intensity values are suppressed by a predefined threshold value (IS) when the geometric center or the maximum (I0) is determined.

5. A method according to claim 4, wherein the threshold value (IS) is between 20% and 50% of the maximum intensity (I0).

6. A method according to claim 5, wherein the threshold value (IS) is on the order of magnitude of 30% of the maximum intensity (I0).

7. A method according to claim 2, wherein a control output signal is generated for direct control of the mirror position.

8. A method according to claim 1, wherein said method is used in a scanning device, and the test object is a scanning mirror which carries out the scanning process using an additional light source.

9. A method according to claim 1, wherein the corresponding distribution function is determined while the test object is stationary, and the distribution function is input into the signal processor.

10. A method according to claim 1, wherein the corresponding distribution function is stored in a memory of the signal processor.

11. An apparatus for generating a control output for a position control loop of a movable test object, said apparatus comprising:

a position sensitive light detector, with at least three light-detecting cells;

an analog to digital converter connected to receive measured position information generated from said light detector when a focussed light spot impinges the at least three light-detecting cells;

a signal processor connected to receive digital position data from said analog to digital converter, said signal processor comprising a memory for storing a distribution function, and a digital to analog converter connected to receive a digital signal from said signal processor and generate an analog position regulating signal therefrom.

12. An apparatus according to claim 11, further comprising a system control computer for calculating a desired object position, said signal processor being connected to said system control computer to receive a desired object position signal from the system control computer, and said signal processor being programmed to effect a comparison of the desired object position signal to a position signal derived from digitized position data received from the analog to digital converter.

13. An apparatus according to claim 12, wherein the signal processor is programmed to generate a position control instruction to offset any deviation detected in the comparison of the desired object position signal to the position signal derived from the digitized position data.

14. An apparatus according to claim 11, wherein said signal processor is programmed to determine a maximum intensity or a center of intensity distribution of a focussed light spot received by the position sensitive light detector from digitized position data received from the analog to digital converter.

15. An apparatus according to claim 11, further comprising an object position control circuit connected to said digital to analog converter for regulating the position of a moveable object in response to an analog position regulating signal received from said digital to analog converter.

* * * * *